(12) United States Patent  (10) Patent No.: US 8,282,132 B2
Griesbaum  (45) Date of Patent: Oct. 9, 2012

(54) PASSENGER MOTOR VEHICLE WITH FUEL MODULE ARRANGED WITHIN A PASSENGER COMPARTMENT

(75) Inventor: Josef Griesbaum, Eberdingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 88 days.

(21) Appl. No.: 13/004,258

(22) Filed: Jan. 11, 2011

(65) Prior Publication Data

US 2011/0175339 A1 Jul. 21, 2011

(30) Foreign Application Priority Data

Jan. 21, 2010 (DE) .......................... 10 2010 005 236

(51) Int. Cl.
*B60P 3/22* (2006.01)

(52) U.S. Cl. ......... 280/834; 280/830; 220/562; 220/564

(58) Field of Classification Search .................. 280/834, 280/830; 220/562, 564
See application file for complete search history.

(56) References Cited

U.S. PATENT DOCUMENTS

| | | | |
|---|---|---|---|
| 4,930,537 A * | 6/1990 | Farmer .......................... 137/265 |
| 6,260,544 B1 * | 7/2001 | Spry et al. ..................... 123/516 |
| 6,875,258 B2 * | 4/2005 | Kuperus .......................... 96/147 |
| 7,040,432 B2 * | 5/2006 | Kawasaki et al. ............. 180/65.1 |
| 7,244,123 B1 * | 7/2007 | Barron .......................... 434/226 |
| 7,244,293 B2 * | 7/2007 | Morita et al. .................... 96/204 |
| 7,303,211 B2 * | 12/2007 | Borroni-Bird et al. ....... 280/831 |

* cited by examiner

*Primary Examiner* — Lesley D Morris
*Assistant Examiner* — Marlon Arce
(74) *Attorney, Agent, or Firm* — Gerald E. Hespos; Michael J. Porco

(57) ABSTRACT

A passenger motor vehicle (1) has a passenger compartment (3) and a fuel tank module (4) is in the passenger compartment (3). The module (4) has first and second chambers (19, 20). The first chamber (19) holds a tank bladder and a catch tank (32) is arranged within the tank bladder. The second chamber (20) holds a fuel pump unit (33). The module (4) is sealed off from remaining areas of the passenger compartment (3), and fuel lines to the module (4) and from the module (4) to the internal combustion engine are arranged outside the passenger compartment (3). Thus, a high level of safety for the vehicle occupant is ensured despite the accommodation of the fuel module in the passenger compartment, and substantially complete emptying of the fuel in the fuel module is possible.

19 Claims, 5 Drawing Sheets

PASSENGER MOTOR VEHICLE WITH FUEL MODULE ARRANGED WITHIN A PASSENGER COMPARTMENT

CROSS-REFERENCE TO RELATED APPLICATION

This application claims priority under 35 USC 119 to German Patent Application No. 10 2010 005 236.1, filed on Jan. 21, 2010, the entire disclosure of which is incorporated herein by reference.

BACKGROUND OF THE INVENTION

1. Field of the Invention

The invention relates to a passenger motor vehicle having a passenger compartment and a fuel tank module arranged in the passenger compartment. Fuel lines extend to the module, within the module and from the module to an internal combustion engine.

2. Description of the Related Art

Passenger motor vehicles used for motor racing sports have a main fuel tank outside the passenger compartment and a fuel tank module that has a container in the passenger compartment to increase the range of the vehicle. Fuel lines are guided from the main tank to the fuel tank module in the passenger compartment, and from the fuel tank module through the passenger compartment to the internal combustion engine. The driver generally is the sole occupant of the passenger compartment. Thus, the fuel tank module is arranged in the region where the co-driver's seat normally would be located. The above-described fuel lines in the passenger compartment may be damaged during an accident. Hence, the fuel tank module poses an elevated risk to the driver. The container of the fuel tank module generally is of simple design and a complete emptying of the container is not possible. Therefore significant residual quantities remain in the container.

It is an object of the invention to refine a passenger motor vehicle so that a high level of safety for the vehicle occupant is ensured regardless of the accommodation of the fuel tank module in the passenger compartment. It is another object of the invention to enable substantially complete emptying of the fuel tank module.

SUMMARY OF THE INVENTION

The invention relates to a passenger motor vehicle with a fuel tank module that has a first chamber that holds a tank bladder and a catch tank arranged within the tank bladder. The fuel tank module also has a second chamber that holds a fuel pump unit. The module within the passenger compartment is completely sealed off to the outside, and the fuel lines to the module and from the module to the internal combustion engine are arranged outside the passenger compartment.

Safety of the vehicle occupant is improved because no fuel lines are guided through the region of the passenger compartment that is not occupied by the fuel tank module. Rather, the fuel lines are guided directly from outside the passenger compartment to the module, and from the module directly out, without passing through the remaining passenger compartment. A leak may occur in the region of the fuel lines, for example in the event of an accident. However, fuel from such a leak cannot pass into the remaining region of the passenger compartment and ignite there.

Secondly, all components relevant for the fuel tank module are arranged within the fuel tank module. Thus, a leak within the fuel tank module will not enable fuel to pass out of the fuel tank module and be ignited in the region of the passenger compartment not occupied by the fuel tank module. Accordingly, there is no elevated risk to the vehicle occupant.

The fuel tank module arranged within the passenger compartment is characterized by a special design. The module is divided functionally into two chambers. The first chamber holds the additional tank reservoir that holds the tank bladder, which preferably is composed of rubber. The catch tank is arranged within the tank bladder. The tank bladder forms the actual fuel volume of the fuel tank module. The catch tank constitutes the fuel volume, which is of considerably smaller volume at a relatively high filling level in the catch tank. The catch tank still is substantially full due to the feeding of fuel out of the tank bladder even when the tank bladder is substantially empty. The displacement of fuel from the relatively large-volume tank bladder into the relatively small-volume catch tank enables substantially complete emptying of the fuel tank module by substantially complete emptying of the catch tank.

The second chamber in the fuel tank module has the functional task of holding at least those units that function to suck fuel out of the catch tank and supply the fuel from the catch tank to the internal combustion engine, in particular to the injection nozzles of the internal combustion engine. The second chamber preferably has a fuel filter and a fuel pressure regulator in addition to the fuel pump unit. The fuel pump module preferably is a returnless system. Fuel pressure is regulated fuel tank module not in the region of the internal combustion engine.

The module preferably is a closed, stable container and the two chambers are formed in the container. The container is made for example of carbon, metal or plastic and may have openings that can be closed off by covers. The tank bladder may be placed into the first chamber of the module through one opening, such as an upper opening. The fuel pump module, including the fuel pump unit, the fuel pressure regulator, the fuel filter and the fuel lines that interact with these parts, can be introduced into the second chamber of the module through a second opening of the container, such as a lateral opening of the container.

The container preferably is fastened to a bulkhead that delimits the passenger compartment. The container may be flange-mounted directly on the bulkhead.

The passenger motor vehicle of the invention preferably has a main tank outside the passenger compartment. Accordingly, the tank bladder and the catch tank in the tank bladder provide an additional fuel volume. The container fastened to the bulkhead that delimits the passenger compartment is therefore an additional container with the two chambers. The fuel lines connect the main tank to the module and the module to the internal combustion engine and the fuel lines are arranged outside the passenger compartment.

The connection of the fuel lines may take place in a variety of ways, as long as it is ensured that the fuel lines are not arranged within that region of the passenger compartment that is not occupied by the module. For example, the container and the bulkhead may have connections for the fuel lines within the module and to the module and from said module to the internal combustion engine. The connections are connected to one another when the container and bulkhead are connected to one another. Thus, the connection of the fuel lines may be effected during the connection of the container to the bulkhead. The fuel lines within the module may be guided in any desired way. For example, fuel lines may be guided through the tank bladder in a sealed fashion.

At least one pump advantageously is arranged in the main tank for feeding fuel from the main tank directly into the catch tank. Thus, the main tank can be emptied into the smaller filling volume of the catch tank rather than into the tank bladder. Correspondingly, at least one pump preferably is arranged in the tank bladder for feeding the fuel from the tank bladder into the catch tank. Thus, the tank bladder can be emptied substantially. Complete emptying of the fuel tank module and the main tank therefore is substantially dependent on the design and emptying capability of the catch tank. The main tank and the tank bladder preferably are connected in their lower region by a connecting line and the main tank can be substantially emptied via the connecting line.

The two chambers preferably are separated from one another by a stable partition. The stable design of the partition enables fasten functional elements of the module to be fastened to the partition. For example, the catch tank may be mounted in the partition. The catch tank is made, for example, of metal, carbon or plastic, and therefore of the same material as the container that forms the two chambers. The fuel pump unit including the fuel pressure regulator and the fuel filter also may be mounted to the partition.

The container, at least the tank bladder with the catch tank situated therein, preferably has a deaeration facility, with a deaeration line connected to the main tank. The deaeration line is guided from the module in a sealed fashion outside the passenger compartment.

Further features of the invention will emerge from the subclaims, the appended drawing and the description of the preferred exemplary embodiment depicted in the drawing, without the invention being restricted thereto.

DETAILED DESCRIPTION OF THE PREFERRED EMBODIMENT

Figure 1:
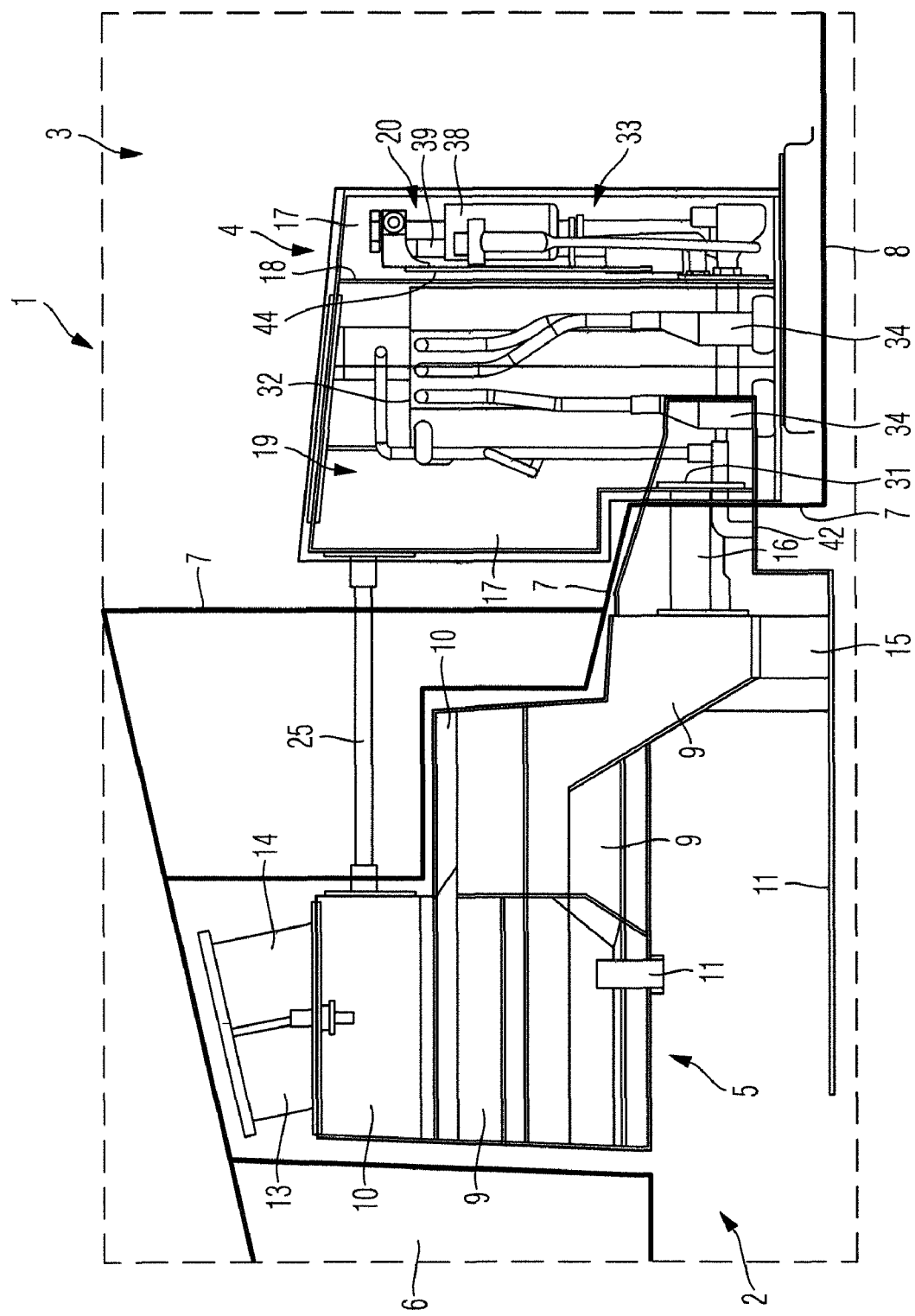
FIG. 1 is a schematic side view of the front half of a passenger motor vehicle that shows the arrangement of the main tank and the fuel tank module arranged in the passenger compartment.

A passenger motor vehicle in accordance with the invention is identified generally by the numeral 1 in FIG. 1. The passenger motor vehicle 1 has a vehicle front end 2 and a passenger compartment 3 situated directly behind the vehicle front end 2. The vehicle usually is designed as a two-seat vehicle. However, the passenger motor vehicle 1 is a racing sports car and therefore is a single-seat vehicle. A fuel tank module 4 is situated next to the driver's seat to form an additional fuel reservoir in the passenger compartment, in addition to a main tank 5 arranged in the vehicle front end 2. A small-volume holding space 6 for objects, in the manner of a luggage compartment, may be formed in front of the main tank 5 in the vehicle front end 2.

A bulkhead 7 divides the vehicle front end 2 from the passenger compartment 3 and a floor panel 8 is defined at the bottom of the passenger compartment 3.

In the following description, reference is made to the illustrations in FIGS. 1 and 2.

A lower region of the main tank 5 is formed as a carbon shell 9 and an upper region is formed as a rubber bladder 10. The carbon shell 9 is mounted by a front holding device 11 designed as a transverse clamping wall fastened to body longitudinal beams (not shown) and screwed via a rear holding device 11 to an underfloor panel of the vehicle. The rubber bladder 10 is connected at the top to a neck unit 12 that has a filler neck 13 and a neck 14 for the aeration and deaeration of the main tank 5. The rubber bladder 10 of the installed main tank 5 is supported by body parts (not shown), such as an opposing wall.

The main tank 5 has a sump 15. A transfer pipe 16 is above the sump 15 in a region where the main tank 5 contacts the bulkhead 7. The transfer pipe 16 extends in a sealed fashion through an opening in the bulkhead 7 and is guided into the fuel tank module 4 situated in the passenger compartment 3.

Figure 3:
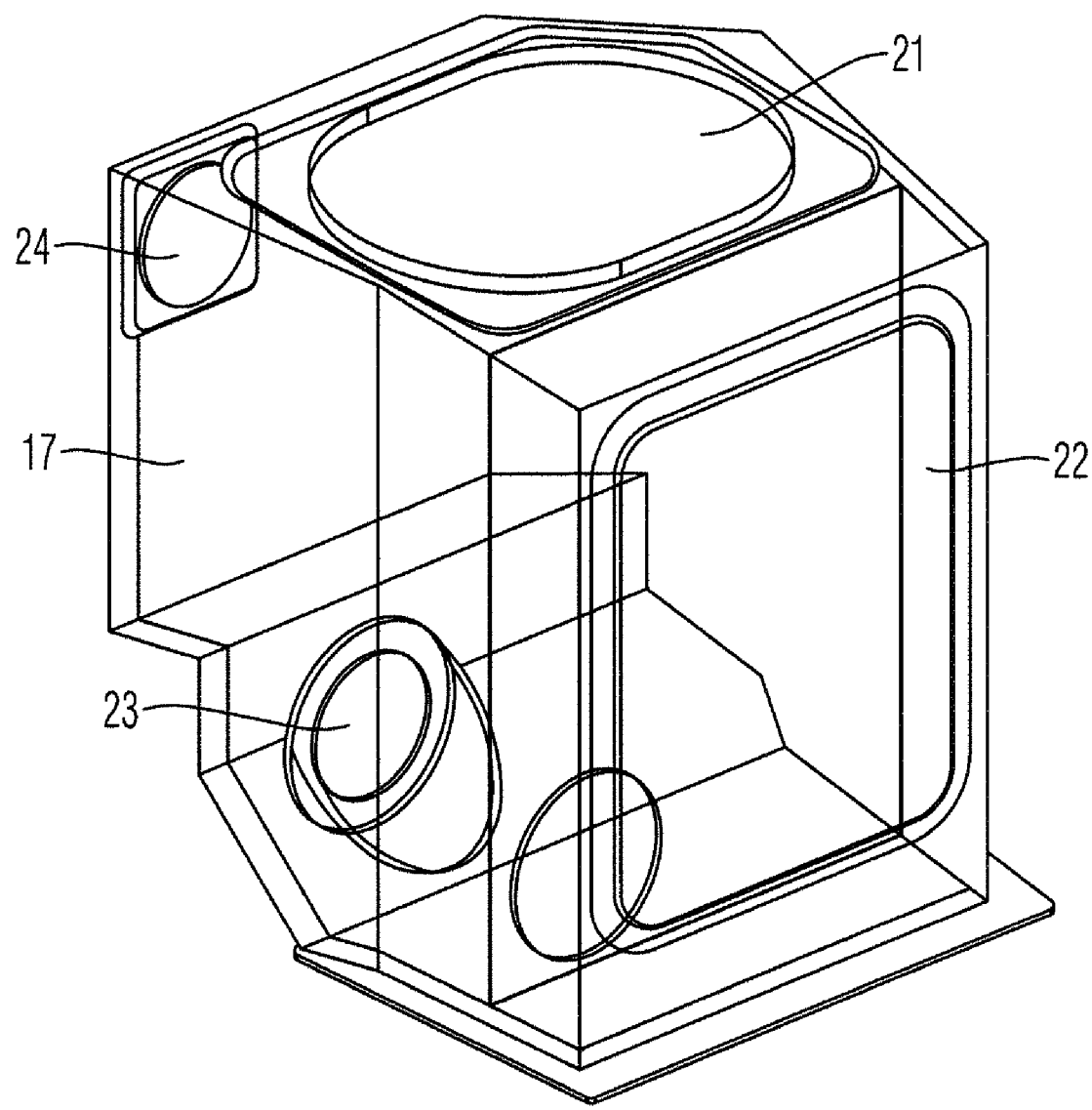
FIG. 3 is a perspective view of the container of the fuel tank module.

The outer wall of the fuel tank module 4 forms a box-shaped container 17, also referred to as a shell. The container 17 is made of carbon and a stable partition 18 arranged perpendicular to the floor panel 8 divides the container 17 into a large first chamber 19 and a small second chamber 20. The front of the container 17 is connected to the bulkhead 7. The design of the container 17 can be seen particularly clearly in FIG. 3, which shows that the top of the container 17 in the region of the chamber 19 has an opening closed by a cover 21. The region of the container 17 that defines the second chamber 20 has a rear opening closed by a cover 22.

A lower opening 23 and an upper opening 24 are formed in portion of the first chamber 19 adjacent the bulkhead 7. The transfer pipe 16 connects to the lower opening 23 and a deaeration pipe 25 is connected to the container 17 at the upper opening 24. The deaeration pipe 25 opens into the top region of the rubber bladder 10 and is flange-connected to said rubber bladder 10 as shown in FIGS. 1 and 2.

Figure 4:
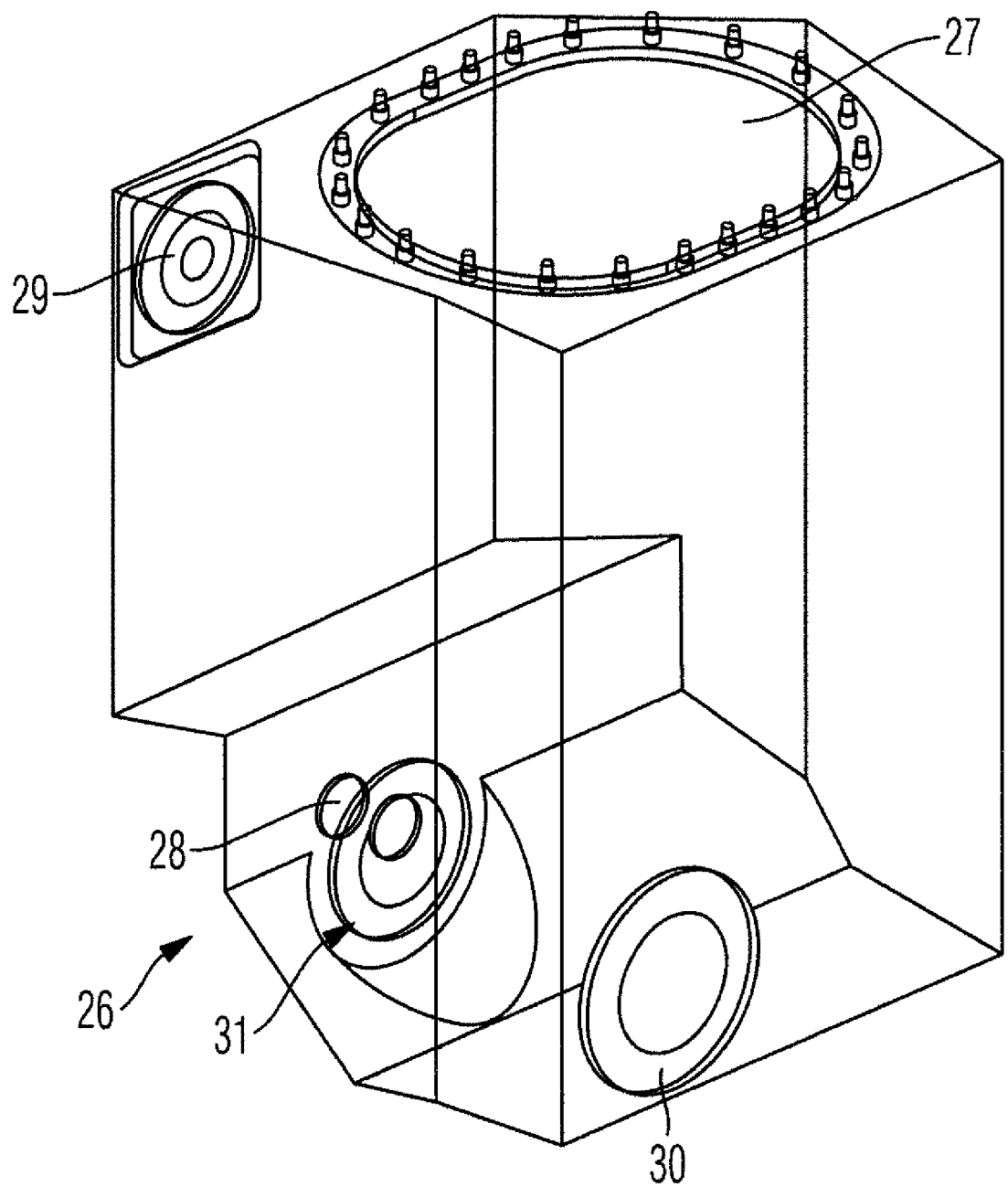
FIG. 4 is a perspective view of the tank bladder to be arranged in the first chamber of the container.

The space of the large first chamber 19 is enclosed substantially by a rubber tank bladder 26, which is shown in FIG. 4. The top of the tank bladder 26 has an opening that can be closed by a cover 27. The tank bladder 26 also has openings 28 and 29 corresponding to the openings 23 and 24 in the container 17 and enable connection of the transfer pipe 16 and the deaeration pipe 25 to the tank bladder 26.

A holding module 31 is arranged within the tank bladder 26 concentrically with respect to the opening 28. The holding module 31 has holes (not shown) for the leadthrough of fuel lines (not shown) that extend through the tank bladder 26. The wall of the tank bladder 26 facing toward the partition 18 has an opening, and a holding module 30 corresponding to the holding module 31 is connected in a sealed fashion to this wall of the tank bladder 26. Openings also are provided at this location for the leadthrough of fuel lines.

Figure 2:
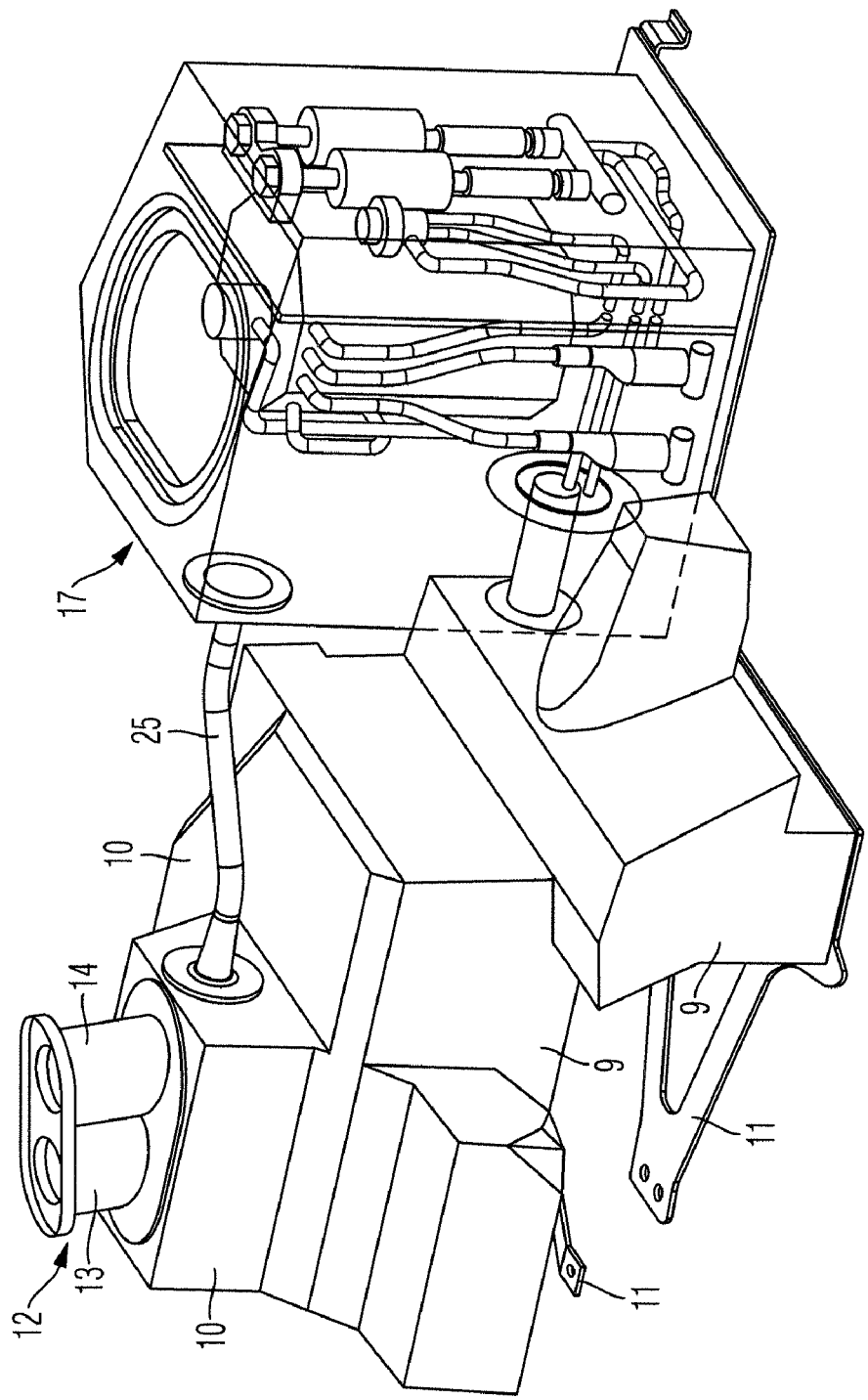
FIG. 2 is a perspective view of the fuel tank module of FIG. 1 without reference to the regions of the passenger motor vehicle.

An aluminum catch tank 32 is arranged in the large first chamber 19 and is fastened to the partition 18, as shown in FIGS. 1 and 2. The small second chamber 20 holds a fuel pump unit 33 mounted to the partition 18 by a mounting plate 44.

Figure 5:
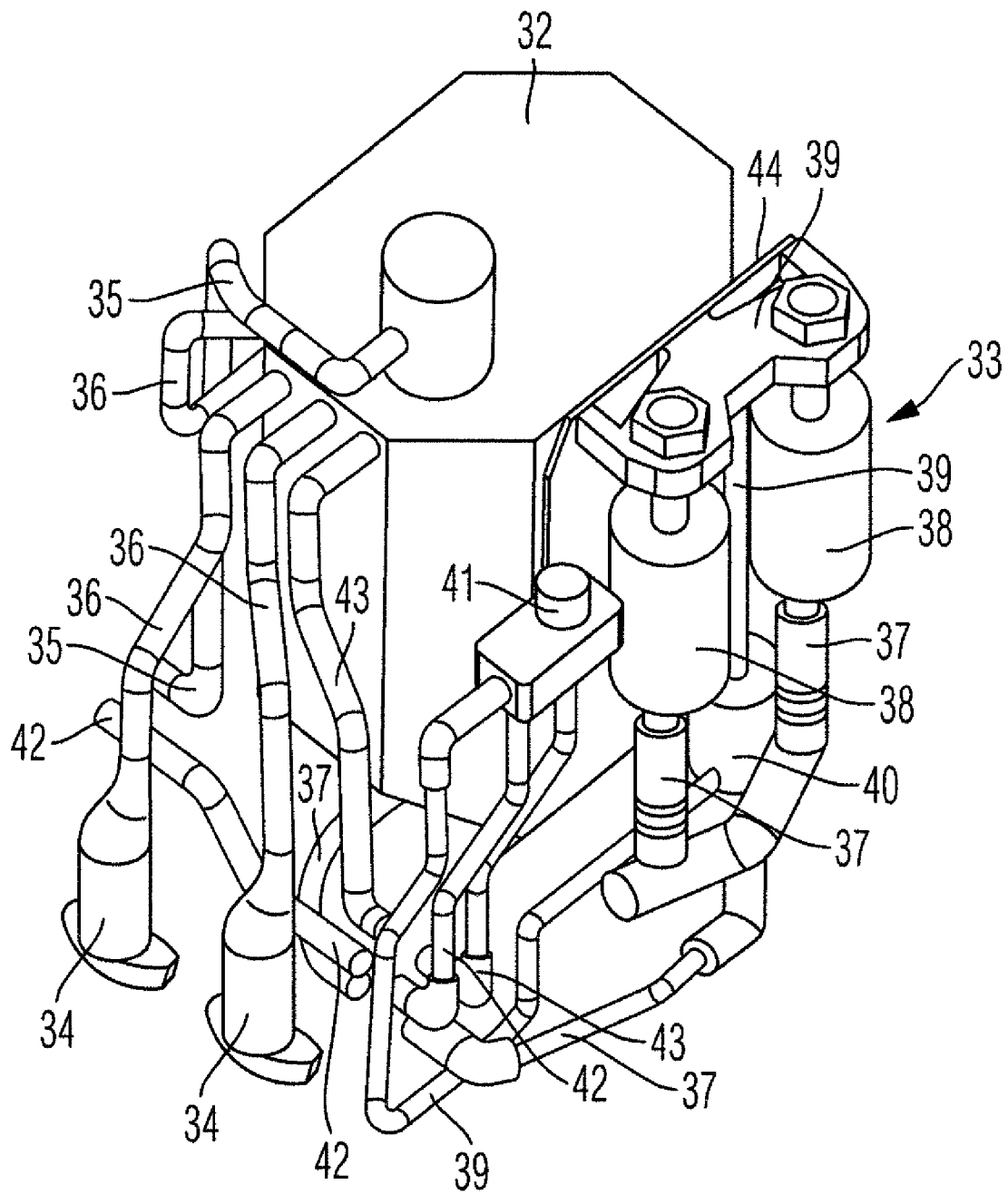
FIG. 5 is a perspective view of the catch tank, fuel lines in the container, and fuel pump module arranged therein.

The feeding of the fuel in the fuel tank module 4 is described with reference to FIGS. 1, 2 and 5. More particularly the fuel passes via the filler neck 13 into the main tank 5, from the main tank 5 through the transfer pipe 16 and into the interior of the tank bladder 26 of the fuel tank module 4. Two pumps (not shown) are assigned to the sump 15 of the main tank 5 to completely empty the main tank 5. The pumps feed fuel via the fuel line 35 shown in FIG. 5 into an opening in the upper end of the catch tank 32. Three pumps 34 are arranged in a sump at the base of the tank bladder 26. The pumps 34 feed fuel in the tank bladder 26 via fuel lines 36 into the upper end of the catch tank 32. A fuel suction line 37 is attached to the base of the catch tank 32. The suction line 37 branches and two pumps 38 suck the fuel out of the catch tank 32 via the branch lines 37. The pumps 38 define a main pump and a reserve pump. The two fuel flows merge in a collector 39 downstream of the pumps 38 and pass from there via a fuel pressure line 39, first to a fuel filter 40 and then to a fuel pressure regulator 41. This system is designed as a returnless system. A fuel pressure line 42 leads from the fuel pressure regulator 41 to the internal combustion engine and has a liquid pressure matched to the pressure of the injection nozzles of the internal combustion engine of the vehicle. The reference numeral 43 denotes fuel return line sections.

Importantly, the fuel tank module 4 is encapsulated with respect to regions of the passenger compartment 3 surrounding the fuel tank module 4. No fuel lines are guided through the passenger compartment 3. Accordingly, fuel will not emerge into the passenger compartment 3 and ignite in the event of a leak, such as a leak caused by an accident. As shown in FIG. 5, the pressure line 42, the return line 43 and the suction line 37 are separated in the region of the partition 18 and are connected sealingly to one another there by the holding module 30 so that the fuel is fed through the lines 37, 42 and 43 from the second chamber 20 into the tank bladder 26. Furthermore, front ends of the pressure line 42 and the fuel line 35 are separated, as shown in FIG. 5. As a result, fuel is conducted through the body-side bulkhead 7 and through the holding module 31, from the main tank 5 to tank bladder 26. The holding module 31 also has the leadthrough for the transfer pipe 16. The pressure line 42 is outside the module 4 adjacent the main tank 5, as shown in FIGS. 1 and 2, and from there to the internal combustion engine.

Therefore, the fuel lines to the module 4 and from the module to the internal combustion engine do not pass through the passenger compartment 3.

What is claimed is:

1. A passenger motor vehicle having a passenger compartment and having a fuel tank module arranged in said passenger compartment, having fuel lines to the module, within the module and from the module to an internal combustion engine, characterized in that the module has a first chamber that holds a tank bladder and a catch tank arranged within the tank bladder, and a second chamber that holds a fuel pump unit, the module within the passenger compartment being completely sealed off to the outside, and the fuel lines to the module and from the module to the internal combustion engine being arranged outside the passenger compartment.

2. The vehicle of claim 1, wherein the module has a closed stable container and the two chambers being formed in the container.

3. The vehicle of claim 2, wherein the container is fastened to a bulkhead that delimits the passenger compartment.

4. The vehicle of claim 2, wherein fuel lines outside the passenger compartment connect the module to a main tank and to the internal combustion engine.

5. The vehicle of claim 4, characterized in that the container and the bulkhead have connections for fuel lines within the module or to the module and from the module to the internal combustion engine, the connections being connected to one another when the container and bulkhead are connected to one another.

6. The vehicle of claim 4, further comprising at least one pump in the main tank for feeding the fuel from the main tank directly into the catch tank.

7. The vehicle of claim 4, further comprising at least one pump in the tank bladder for feeding the fuel from the tank bladder into the catch tank.

8. The vehicle of claim 2, wherein the two chambers are separated by a stable partition.

9. The vehicle of claim 8, wherein the catch tank is mounted to the partition.

10. The vehicle of claim 8, wherein the fuel pump unit has a fuel filter and a fuel pressure regulator arranged in the second chamber.

11. The vehicle of claim 10, wherein the fuel pump unit, including the fuel filter and the fuel pressure regulator, is mounted to the partition.

12. The vehicle of claim 2, further comprising a deaeration line connecting the container to the main tank, the deaeration line being guided out of the module in a sealed fashion outside the passenger compartment.

13. A passenger motor vehicle having a passenger compartment and a fuel tank module in the passenger compartment, the fuel tank module comprising:
    a first chamber that holds a tank bladder and a catch tank arranged within the tank bladder;
    a second chamber that holds a fuel pump unit; and
    fuel lines to the module and from the module to an internal combustion engine being arranged outside the passenger compartment so that fuel flow to and from the module is sealed off from the passenger compartment.

14. The vehicle of claim 13, wherein the module has a closed stable container and the two chambers being formed in the container.

15. The vehicle of claim 14, wherein the container is fastened to a bulkhead that delimits the passenger compartment.

16. The vehicle of claim 14, further comprising at least one pump in the main tank for feeding the fuel from the main tank directly into the catch tank.

17. The vehicle of claim 14, further comprising at least one pump in the tank bladder for feeding the fuel from the tank bladder into the catch tank.

18. The vehicle of claim 14, wherein the two chambers are separated by a stable partition.

19. The vehicle of claim 18, wherein the catch tank is mounted to the partition.

* * * * *